(12) United States Patent
Stählin

(10) Patent No.: US 11,138,882 B2
(45) Date of Patent: Oct. 5, 2021

(54) VEHICLE-TO-X COMMUNICATION SYSTEM

(71) Applicant: Continental Teves AG & Co. oHG, Frankfurt am Main (DE)

(72) Inventor: Ulrich Stählin, Rochester, MI (US)

(73) Assignee: Continental Teves AG & Co. oHG

( * ) Notice: Subject to any disclaimer, the term of this patent is extended or adjusted under 35 U.S.C. 154(b) by 0 days.

(21) Appl. No.: 16/640,189

(22) PCT Filed: Nov. 9, 2018

(86) PCT No.: PCT/DE2018/200102
§ 371 (c)(1),
(2) Date: Feb. 19, 2020

(87) PCT Pub. No.: WO2019/091520
PCT Pub. Date: May 16, 2019

(65) Prior Publication Data
US 2020/0294400 A1 Sep. 17, 2020

(30) Foreign Application Priority Data
Nov. 10, 2017 (DE) ................. 10 2017 220 023.5

(51) Int. Cl.
*G08G 1/16* (2006.01)
*H04W 4/40* (2018.01)
(Continued)

(52) U.S. Cl.
CPC .............. *G08G 1/16* (2013.01); *G01S 19/08* (2013.01); *G01S 19/396* (2019.08); *H04W 4/40* (2018.02)

(58) Field of Classification Search
None
See application file for complete search history.

(56) References Cited

U.S. PATENT DOCUMENTS 8,994,520 B2 3/2015 Stählin et al.
9,507,028 B1 * 11/2016 Yoo ................. H04N 5/23229
(Continued)

FOREIGN PATENT DOCUMENTS

DE 102010040803 A1 3/2012
DE 102013210890 A1 12/2014
(Continued)

OTHER PUBLICATIONS

German Search Report for German Application No. 10 2017 220 023.5, dated Jun. 21, 2018 with partial translation, 8 pages.
(Continued)

*Primary Examiner* — Curtis J King
(74) *Attorney, Agent, or Firm* — RatnerPrestia

(57) ABSTRACT

A vehicle-to-X communication system for use in a vehicle, including a first communication interface which is configured to receive a first signal from at least one satellite, a second communication interface which is configured to receive a second signal from at least one environment object, and a controller which is configured to determine a quality of the first signal. The controller is further configured to generate a signal for controlling an output unit of the vehicle depending on the determined quality of the first signal and of the second signal in order to issue warning information about the at least one environment object.

10 Claims, 1 Drawing Sheet

(51) Int. Cl.
*G01S 19/39* (2010.01)
*G01S 19/08* (2010.01)

(56) References Cited

U.S. PATENT DOCUMENTS

| | | | | |
|---|---|---|---|---|
| 10,217,357 | B1* | 2/2019 | Elsheemy | G08G 1/09623 |
| 10,229,592 | B1* | 3/2019 | Elsheemy | B60T 8/17557 |
| 10,650,673 | B1* | 5/2020 | Elsheemy | G08G 1/081 |
| 2008/0010012 | A1* | 1/2008 | Chen | G01C 21/26 |
| | | | | 701/412 |
| 2011/0307171 | A1* | 12/2011 | Waite | G01C 21/30 |
| | | | | 701/421 |
| 2012/0209519 | A1* | 8/2012 | Basnayake | H04W 64/00 |
| | | | | 701/457 |
| 2013/0141578 | A1* | 6/2013 | Chundrlik, Jr. | B60H 1/00771 |
| | | | | 348/148 |
| 2013/0248658 | A1* | 9/2013 | Takagi | G01S 19/50 |
| | | | | 246/122 R |
| 2014/0242904 | A1* | 8/2014 | Pandey | H04B 7/24 |
| | | | | 455/39 |
| 2015/0378015 | A1* | 12/2015 | You | G01S 19/48 |
| | | | | 701/469 |
| 2016/0088422 | A1* | 3/2016 | Foster | H04W 4/48 |
| | | | | 455/41.2 |
| 2019/0113630 | A1 | 4/2019 | Hermann et al. | |
| 2019/0179323 | A1 | 6/2019 | Ewert | |
| 2019/0369640 | A1* | 12/2019 | He | G01S 19/48 |
| 2020/0025575 | A1* | 1/2020 | Weissman | G01S 13/867 |
| 2020/0108772 | A1* | 4/2020 | Max | B60Q 9/008 |
| 2020/0182618 | A1* | 6/2020 | Xu | G06F 9/30036 |
| 2020/0223449 | A1* | 7/2020 | Tsuji | B60W 30/10 |

FOREIGN PATENT DOCUMENTS

| | | |
|---|---|---|
| DE | 102016205843 A1 | 10/2017 |
| DE | 102016209556 A1 | 12/2017 |

OTHER PUBLICATIONS

International Search Report and Written Opinion for International Application PCT/DE2018/200102, dated Feb. 21, 2019, 9 pages.

* cited by examiner

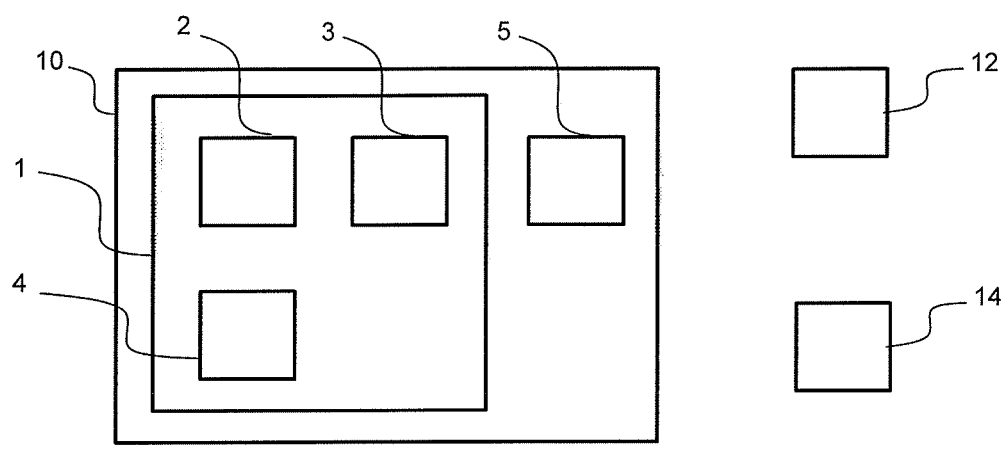

VEHICLE-TO-X COMMUNICATION SYSTEM

CROSS REFERENCE TO RELATED APPLICATIONS

This application is the U.S. National Phase Application of PCT International Application No. PCT/DE2018/200102, filed Nov. 9, 2018, which claims priority to German Patent Application No. 10 2017 220 023.5, filed Nov. 10, 2017, the contents of such applications being incorporated by reference herein.

FIELD OF THE INVENTION

The present invention relates to a vehicle-to-X communication system and to a vehicle comprising such a vehicle-to-X communication system.

BACKGROUND OF THE INVENTION

External conditions such as bad weather or dense construction can greatly restrict the vision of a driver of a vehicle with respect to a road lying ahead of the driver. As a result, the driver may possibly not detect oncoming vehicles in due time to initiate appropriate evasive maneuvers. In order to prevent or at least limit such situations for the driver of a vehicle, vehicles are often outfitted with a plurality of environment sensors and cameras which are capable of timely detection of approaching environment objects such as vehicles or infrastructure.

However, it is disadvantageous that the vehicles must be outfitted or retrofitted with a correspondingly high technical effort with respect to hardware and software in order to achieve the capacity, even in poor visibility circumstances for the driver of a vehicle, to provide reliable information about environment objects approaching the driver or located in the environment of the driver's route.

SUMMARY OF THE INVENTION

An aspect of the present invention provides an efficient concept for a vehicle-to-X communication system for use in a vehicle by which the driver of the vehicle is informed in a simple, timely and reliable manner about an environment object located in front of the driver in poor visibility circumstances. A further object is to provide a vehicle-to-X communication system to enable retrofitting of existing vehicles without high additional technical or financial cost so that the vehicles are capable of alerting the driver to dangerous environment objects in poor visibility circumstances.

According to an aspect of the invention, the above-stated object is met through the features of the independent patent claim. Advantageous embodiment forms of aspects of the present invention are the subject matter of the dependent claims, the description and the drawings.

According to a first aspect, the invention is directed to a vehicle-to-X communication system for use in a vehicle, comprising a first communication interface which is configured to receive a first signal from at least one satellite, a second communication interface which is configured to receive a second signal from at least one environment object, a controller which is configured to determine a quality of the first signal and which is further configured to generate a signal for controlling an output unit of the vehicle depending on the determined quality of the first signal and of the second signal in order to issue warning information about the at least one environment object.

The vehicle may be, for example, a motor vehicle, particularly a passenger vehicle, a truck, a motorcycle, an electric vehicle or a hybrid vehicle.

The idea underlying an aspect of the present invention consists in that the quality of a first signal received from a satellite, also known as a GNSS signal or GPS signal, is determined by a controller of the vehicle-to-X communication system of the vehicle. Depending on the determined quality of the first signal and of a second signal received from at least one environment object, for example, another vehicle approaching the first vehicle, which is received by the vehicle-to-X communication system of the vehicle via V2X communication interface, the controller generates a signal for controlling an output unit of the vehicle to issue warning information in a timely manner about this oncoming further vehicle or this at least one environment object.

The second signal received via the second (V2X) communication interface can contain position information and/or speed information about the oncoming vehicle.

If the controller of the vehicle-to-X communication system of the vehicle has determined a high quality of the received first (GNSS) signal, i.e., favorable existing GNSS conditions, the vehicle-to-X communication system of the vehicle assumes that good visibility conditions or favorable visibility circumstances exists for the driver of the vehicle with the vehicle-to-X communication system according to an aspect of the invention. In this case, warning information is issued at a later time. The warning information to be issued can be carried out in one level in a scenario of this type.

However, if the controller of the vehicle-to-X communication system of the vehicle has determined a poor quality of the received first (GNSS) signal, which is an indication of poor or unfavorable existing GNSS conditions, the vehicle-to-X communication system of the vehicle assumes that poor visibility conditions or visibility circumstances exist for the driver of the vehicle with the vehicle-to-X communication system according to an aspect of the invention. In this case, warning information is issued on the output unit at an earlier time than would be the case under good existing GNSS conditions. The warning information to be issued can be carried out in multiple levels in a scenario this kind. This means that the warning information to be issued is adapted to the respective urgency level or escalation level with respect to the form in which and frequency with which it is issued. The closer, for example, the environment object coming toward the vehicle, the louder or optically more noticeable the warning information is so as to prevent a possible collision between the two vehicles.

One advantage achieved by an aspect of the present invention consists in that only the quality of the received first signal must be determined to warn the driver of dangerous vehicles or, generally, of an environment object or a plurality of environment objects in poor visibility circumstances to decide whether or not poor visibility conditions exist. Other technical aids or additional technical aids such as environment sensors and/or camera systems are not required. A dangerous vehicle or a dangerous environment object can be—but is not limited to—an oncoming vehicle or an approaching environment object, for example.

Together with the V2X communication interface and the received second signal, it can then be determined in an efficient manner by the vehicle-to-X communication system of the vehicle whether the signal for controlling the output unit of the vehicle for issuing correspondingly adapted warning information on the output unit of the vehicle is to be generated at an earlier time or at a later time or, in other words, whether the warning information should be issued at an earlier time or at a later time and with what frequency or escalation level.

A further advantage of an aspect of the present invention consists in that existing vehicles can be retrofitted in a very simple manner and without great added technical effort and financial cost, since only the vehicle-to-X communication system according to an aspect of the invention need be installed in the respective vehicle to achieve the capacity to warn the driver of the vehicle in a timely manner of approaching environment objects in poor visibility circumstances.

According to an embodiment form of the present invention, the controller is configured to compare an actual value of the received first signal to a target value of the received first signal, and the controller is further configured to determine the quality of the first signal when there is a discrepancy between the actual value of the first signal and the target value of the first signal. This achieves the advantage that the quality of the first signal can be determined efficiently and accurately.

According to an embodiment form of the present invention, the first signal comprises a time indication and/or a distance indication of the at least one satellite. This achieves the advantage that the controller of the vehicle can determine the position and speed of the vehicle.

According to an embodiment form of the present invention, the second signal comprises a position and/or a speed of the at least one environment object. This achieves the advantage that the distance of the vehicle from the at least one environment object can be determined efficiently and accurately.

According to an embodiment form of the present invention, the controller is configured to determine the quality of the first signal depending on the quantity of usable satellites and/or on a DOP (dilution of precision) value determinable by the controller based on the first signal. This achieves the advantage that the quality of the first signal can be determined efficiently and accurately in order to issue the warning information in a manner appropriate to the situation, i.e., depending on the respective weather situation.

According to an embodiment form of the present invention, the controller is configured to determine the time to issue the generated signal for controlling the output unit depending on the determined quality of the first signal. This achieves the advantage that the warning information is issued in a time-variable and situation-appropriate manner, i.e., depending on the respective weather situation. When the quality of the first signal is good, the warning information can be issued later, since good visual conditions exist for the driver. If the quality of the first signal is poor, warnings are issued at an earlier time and more frequently because the visual conditions for the driver are poor.

According to an embodiment form of the present invention, the controller is configured to determine the quality of the first signal over a definable period of time and to generate the time for the signal for controlling the output unit depending on an average or median of the quality of the first signal over this period of time. This achieves the advantage that the time when the warning information is issued, for example, when qualities of the received first signal change rapidly—contingent upon rapidly changing GNSS conditions—can be correspondingly adapted. Accordingly, the development of the quality of the first signal is observed over a definable period of time and an arithmetic average is taken of the sum of quality values, for example, which average can form the basis for the time at which the signal for controlling the output unit of the vehicle is generated, i.e., the time at which and the frequency with which the warning information corresponding to the signal is issued. Instead of an average, a median can also be determined.

According to an embodiment form of the present invention, the second communication interface is formed as a V2X communication interface. This achieves the advantage that the controller of the vehicle-to-X communication system can receive V2X messages from environment objects which can be, but are not limited to, oncoming vehicles, for example. These V2X messages can contain position information and/or speed information about the oncoming vehicle. Based on this information, the controller of the vehicle-to-X communication system can then determine a distance between the vehicle of the vehicle-to-X communication system and the oncoming other, or second, vehicle. The V2X communication interface can be constructed as a wireless communication interface or a wired communication interface.

According to an embodiment form of the present invention, the controller is configured to determine a distance between the vehicle and the at least one environment object based on the first signal and second signal, and the controller is configured to generate the signal for controlling the output unit for issuing the warning information depending on the determined distance between the vehicle and the environment object. This achieves the advantage that an earlier time or later time for issuing the warning information and the manner in which the warning information is issued can be determined efficiently and in a manner appropriate to the situation so that the driver of the vehicle can be afforded greater leeway for handling for adapting his or her driving behavior.

According to a second aspect, the present invention is directed to a vehicle which comprises a vehicle-to-X communication system.

BRIEF DESCRIPTION OF THE DRAWINGS

Further embodiment examples are described in more detail with reference to the accompanying FIGURE. Therein:

The FIGURE shows a schematic illustration of a vehicle-to-X communication system for a vehicle according to an embodiment form of the invention.

DETAILED DESCRIPTION OF THE PREFERRED EMBODIMENTS

The FIGURE shows a schematic illustration of a vehicle-to-X communication system 1 for use in a vehicle 10. The vehicle-to-X communication system 1 comprises a first communication interface 3 which is configured to receive a first signal from at least one satellite 14, a second communication interface 4 which is configured to receive a second signal from at least one environment object 12, a controller 2 which is configured to determine a quality of the first signal, wherein the controller 2 is further configured to generate a signal for controlling an output unit 5 of the vehicle 10 depending on the determined quality of the first signal and of the second signal in order to issue warning information about the at least one environment object 12.

Accordingly, the at least one environment object 12 can comprise one or more environment objects.

The first signal for which the quality is determined can be configured as a so-called GNSS signal or GPS signal which is conveyed to the vehicle-to-X communication system 1 by the at least one satellite 14 via the first communication interface 3. The first communication interface 3 can also be configured as a communication module which has a corresponding antenna for receiving the first signal.

The first signal can comprise a time indication and/or a distance indication of the at least one satellite 14. With this information, the controller 2 of the vehicle-to-X communication system 1 can then determine the position and/or the speed of the vehicle 10. The distance indication of the at least one satellite 14 may refer to the distance of the satellite 14 from the vehicle 10.

The quality of the first signal can be determined in that the controller 2 is configured to compare an actual value of the received first signal to a target value of the received first signal, and wherein the controller 2 is further configured to determine the quality of the first signal in case the actual value of the first signal deviates from the target value of the first signal. Within the meaning of an aspect of the present invention, the phrase "quality of the first signal" is also construed as a reception quality of the first signal.

However, alternatively or additionally, the quality of the first signal can also be determined by the controller 2 depending on the quantity of usable satellites and/or on a DOP (dilution of precision) value determinable by the controller 2 based on the first signal. Possible sources of interference which negatively influence the GNSS signal of the satellite 14 received by the controller 2, for example, due to densely built-up surroundings, can be detected in this way. "Object" can be a vehicle or infrastructure.

As a rule, the quality of the GNSS signal received by the vehicle-to-X communication system 1 is poor when, for example, there is an obstructing structure at the roadside or bad weather conditions and, therefore, broadly speaking, poor GNSS conditions prevail. This low quality of the GNSS signal may express itself, for example, in a reduced quantity of visible or usable satellites. Accordingly, under poor GNSS conditions, poor visual conditions for the driver of the vehicle 10 are assumed. Under good GNSS conditions which express themselves in a high quality of the first signal or a high reception quality of the first signal, good visual conditions for the driver of the vehicle 10 are assumed.

Whether or not warning information is issued on the output unit 5 of the vehicle 10 and the frequency and form of this warning information depends essentially on the determined quality (or the determined characteristic value) of the received first signal or, in other words, on the detected GNSS interference of the first signal. The issuing of the warning information fitting a respective situation with corresponding weather conditions can also be understood as a situation-specific switching of warning thresholds.

The second signal which is received by the controller 2 of the vehicle-to-X communication system 1 via the second communication interface 4 can comprise information about a position and/or a speed of the at least one environment object 12. The at least one environment object 12 can be another vehicle or a further vehicle which is located or stopped in the environment of the vehicle 10 and/or an infrastructure object such as a traffic light, but can also be a traffic participant with a corresponding device capable of communicating with the vehicle-to-X communication system 1 via the second communication interface 4.

The second communication interface 4 can preferably be configured as a V2X-based communication interface. This second communication interface 4 can be configured wirelessly. This has the advantage that the communication between V2X-based vehicles can be carried out efficiently over large distances. The V2X-based communication interface 4 may comprise a communication module with corresponding transmitting and/or receiving characteristic, for example, an antenna (not shown in the FIGURE) for receiving and transmitting V2X messages.

Vehicle-to-X (V2X) communication based, for example, on IEEE 802.11p for vehicles is currently being introduced commercially. Vehicle-to-X (V2X) communication enhances the capabilities of vehicles for digital communication with the intention of increasing safety for the participating traffic participants and to optimize traffic flow. Vehicle-to-X communication comprises a vehicle-to-vehicle (V2V) communication and a vehicle-to-infrastructure (V2I) communication. V2V communication makes it possible to exchange information between different vehicles such as information about position and speed of the vehicles in question in order to avoid accidents between the participating vehicles. V2I communication can provide vehicles with information about their driving environment, for example, traffic information or information about obstructions on a road. Accordingly, the technological basis for a digitally linked vehicle within the meaning of an aspect of the present invention is provided by the vehicle-to-X communication system 1 according to an aspect of the invention with the second V2X-based communication interface 4 for use in the vehicle 10.

The controller 2 of the vehicle-to-X communication system 1 can be further configured to determine the time for issuing the generated signal for controlling the output unit 5 of the vehicle 10 depending on the determined quality of the first signal. Accordingly, if the determined quality of the received first signal is good, i.e., corresponds to an appropriate characteristic value, it is assumed that GNSS conditions and, accordingly, visual conditions are good. In such a case, the warning information is issued at a later time. Under poor GNSS conditions which are expressed in a corresponding characteristic value of the determined quality of the received first signal, poor visual conditions are assumed and, therefore, a warning is issued earlier and/or with greater frequency and/or with greater intensity, i.e., the warning information is issued more frequently, for example.

The warning information should inform the driver of the vehicle 10 in a timely manner whether, for example, a (dangerous) environment object 12 is approaching the driver which may not be discerned due to the poor visual conditions themselves or which presents a danger for the driver and how much time still remains for avoiding a collision with this environment object 12. The issuing of warning information on the output unit 5 of the vehicle 10 is accordingly adapted in a corresponding manner—whether in the frequency and/or the manner in which the warning information is issued via acoustic and/or optical and/or haptic methods—depending on the determined quality of the first signal. Depending on the determined quality of the first signal, the warning can take place in a plurality of levels. This means that different escalation levels are used in the issuing of warning information depending on how urgent the warning to be issued is for the driver of the vehicle 10.

A dangerous vehicle or a dangerous environment object 12 can be—but is not limited to—a vehicle approaching vehicle 10 or an oncoming environment object 12, for example.

The output unit 5 of the vehicle 10 can be configured as a head-up display or a display or a loudspeaker or a (vibration) motor or as an installable device as component part of the vehicle 10. However, the output unit 5 can also be a mobile terminal of the driver such as a smartphone or tablet which can be linked to the controller 2 of the vehicle 10 by a corresponding further communication interface so that it can be controlled by the generated signal of the controller 2.

The controller 2 can be further configured to determine the quality of the first signal over a definable period of time and to generate the time for the signal for controlling the output unit 5 depending on an average of the quality of the first signal over this period of time. A uniform adaptation of warning thresholds can be achieved in this way. Accordingly, the GNSS conditions of the first signal are observed for a defined period of time. The individual characteristic values for the quality of the first signal are plotted within this period of time and subsequently averaged. This can be carried out, for example, with the help of an averaging filter. In this way, the development of the quality of the first signal for this period of time can be observed. This information can finally be used to correspondingly adapt the signal for controlling the output unit 5. Additionally, so-called hystereses can be used which are formed such that a warning is issued earlier rather than later so that the adaptation is configured rather conservatively. A median may also be used, for example, instead of averaged quality.

The controller 2 of the vehicle-to-X communication system 1 can further be configured to determine a distance between the vehicle 10 and the at least one environment object 12 based on (the quality of) the first signal and of the second signal, and the controller 2 is configured to generate a signal for controlling the output unit 5 or the output of warning information depending on the determined distance between the vehicle 10 and the at least one environment object 12. The distance information can be used by the controller 2 to decide whether or not the warning information should be issued earlier or later and in what form on the output unit 5.

LIST OF REFERENCE NUMERALS 1 vehicle-to-X communication system
2 controller
3 first communication interface
4 second communication interface
5 output unit
10 vehicle
12 environment object
14 satellite

The invention claimed is:

1. A vehicle-to-X communication system for use in a vehicle, comprising:
    a first communication interface which is configured to receive a first signal from at least one satellite;
    a second communication interface which is configured to receive a second signal from at least one environment object, the second signal indicating the presence of the at least one environment object; and
    a controller which is configured to:
        determine a quality of the first signal,
        determine, based on the quality of the first signal, driver visibility for a driver of the vehicle with respect to the presence of the at least one environment object,
        when the driver visibility is determined to be below a visibility threshold based on the quality of the first signal,
            generate a warning signal for controlling an output unit of the vehicle to issue warning information about the at least one environment object indicated in the second signal, and
        when the driver visibility is determined to be above a visibility threshold based on the quality of the first signal:
            do not issue the warning information, or
            delay the issuing of the warning information, or
            reduce a frequency of issuing the warning information, or
            reduce an intensity of issuing the warning information.

2. The vehicle-to-X communication system according to claim 1, wherein the controller is configured to compare an actual value of the received first signal to a target value of the received first signal, and wherein the controller is further configured to determine the quality of the first signal when there is a discrepancy between the actual value of the first signal and the target value of the first signal.

3. The vehicle-to-X communication system according to claim 1, wherein the first signal comprises a time indication and/or a distance indication of the at least one satellite.

4. The vehicle-to-X communication system according to claim 1, wherein the second signal comprises a position and/or a speed of the at least one environment object.

5. The vehicle-to-X communication system according to claim 1, wherein the controller is configured to determine the quality of the first signal depending on the quantity of usable satellites and/or on a DOP (dilution of precision) value determinable by the controller based on the first signal.

6. The vehicle-to-X communication system according to claim 1, wherein the controller is configured to determine a time to issue the generated signal for controlling the output unit depending on the determined quality of the first signal.

7. The vehicle-to-X communication system according to claim 1, wherein the controller is configured to determine the quality of the first signal over a definable period of time and to generate a time for the signal for controlling the output unit depending on an average or a median of the quality of the first signal over this period of time.

8. The vehicle-to-X communication system according to claim 1, wherein the second communication interface is configured as a V2X communication interface.

9. The vehicle-to-X communication system according to claim 1, wherein the controller is configured to determine a distance between the vehicle and the at least one environment object based on the first signal and second signal, and wherein the controller is configured to generate a signal for issuing the warning information depending on the determined distance between the vehicle and the environment object.

10. A vehicle comprising:
    a vehicle-to-X communication system for use in the vehicle, the vehicle-to-x communication system including:
        a first communication interface which is configured to receive a first signal from at least one satellite;
        a second communication interface which is configured to receive a second signal from at least one environment object, the second signal indicating the presence of the at least one environment object; and
        a controller which is configured to:
            determine a quality of the first signal, determine, based on the quality of the first signal, driver visibility for a driver of the vehicle with respect to the presence of the at least one environment object, when the driver visibility is determined to be below a visibility threshold based on the quality of the first signal, generate a warning signal for controlling an output unit of the vehicle to issue warning information about the at least one environment object indicated in the second signal, and when the driver visibility is determined to be above a visibility threshold based on the quality of the first signal:
- do not issue the warning information, or
- delay the issuing of the warning information, or
- reduce a frequency of issuing the warning information, or
- reduce an intensity of issuing the warning information.

* * * * *